UNITED STATES PATENT OFFICE.

STANISLAW LASZCZYNSKI, OF BERLIN, GERMANY, ASSIGNOR TO TITUS VON MICHALOWSKI, OF BERLIN, GERMANY.

STORAGE BATTERY.

SPECIFICATION forming part of Letters Patent No. 714,201, dated November 25, 1902.

Application filed February 23, 1901. Serial No. 48,611. (No model.)

*To all whom it may concern:*

Be it known that I, STANISLAW LASZCZYNSKI, a subject of the Emperor of Austria-Hungary, residing at Berlin, in the Kingdom of Prussia, Germany, have invented certain new and useful Improvements in Storage Batteries; and I do hereby declare the following to be a full, clear, and exact description of the invention, such as will enable others skilled in the art to which it appertains to make and use the same.

The present invention relates to storage batteries; and it consists of the details of construction hereinafter set forth, and particularly pointed out in the claims.

Of all metallic oxids hitherto employed as depolarizers for zinc-alkali storage batteries nickel oxid ($Ni_2O_3$) is, as is well known, the most suitable. In the first place, it is absolutely insoluble in alkali. In the second place, as an endothermic body it renders possible the complete conversion of the heat generated by oxidation of the zinc into electric power, and, finally, when being opposed to a zinc plate in hydrates of potassium or sodium it supplies a tension of 1.85 volts, which is not much less than the tension of a lead accumulator. A further advantage is that it is effective in discharging very powerful and constant currents when the storage battery is in action.

The ordinary form of an alkaline storage battery is such that the zinc forms the soluble anode—*i. e.,* it dissolves in the electrolyte at the discharge of the battery and separates out again when the battery is charged. This arrangement has, however, some disadvantages. Thus, for instance, the electrolyte at the bottom of the receptacle will become more concentrated and the whole will have to be stirred up from time to time. Again, if the battery is severely overcharged some of the zinc separates out in a spongy form if the electrolyte does not contain much zinc. Finally, in the case of normal charging it is not possible to employ high densities of the charging-current without the danger of deterioration of the zinc-metal deposit. For these reasons it is advantageous to give the zinc a form in which it can readily oxidize, but cannot dissolve—*i. e.,* a form in which it forms an insoluble electrode. This is attained by pasting a frame or grate or any suitable form of electrodes with zinc sponge, zinc oxid, or zinc combinations in the same manner as with lead-sponge plates. Instead of employing zinc plate for the carrier-frame it may be made of amalgamated iron or nickel plate or other suitable plate. A number of electrodes thus formed are mounted to alternate with nickel-oxid plates, being separated from the latter by a sheet of parchment-paper only, the electrode-block thus formed being then placed in a receptacle exactly large enough to contain it. As electrolyte a solution of potassium or sodium aluminates, in which the zinc oxid is insoluble, should be filled into the receptacle. Since the electrodes lie very close together, there will be room for but comparatively little liquid—in fact, only such quantity as will be absorbed by the porous plates and the parchment-paper. Sufficient oxygen is always present for the oxidizing process, because it is always furnished by the one electrode when absorbed by the other. In every moment of charging or discharging the total amount of it should not vary. The sponge-zinc will be prevented from falling out by the parchment-paper lying close to it at both sides. The oxidation and reduction of the zinc-sponge plate will take place evenly and regularly. In this arrangement the zinc represents an insoluble anode. The battery may be charged with stronger currents than it was possible to employ in connection with soluble anodes, because it is not necessary to pay attention to the well-looking of the zinc deposit at the positive electrode. Overcharging is quite uninjurious. A great advantage is attained in the saving of electrolyte and the consequent reduction of the weight and volume of the accumulator. Instead of the diluted potassium or sodium hydrates such salts of alkali metals may be employed the anions of which do not have a dissolving effect on the nickel-oxid plates—for instance, the aluminates, carbonates, and bicarbonates of the alkali metals. The employment, for instance, of carbonate of potassium has the great advantage that the battery will then work with an entirely neutral electrolyte, and there will consequently be no necessity for protecting the battery against the carbonic acid of the air. On the other hand, the charging tension will be much higher owing to the free carbonic acid present at the anode. When the battery is discharged, the tension will be the same as in the case of an alkali-metal hydrate. The output of energy is therefore somewhat less than with the employment of alkali hydrate. If, however, bicarbonate is added to the carbonate solution, the high tension will remain constant at the discharge also, since the bicarbonate acts as free acid. Thus the tension corresponding with the thermic moments will average about 0.3 per cent. volt higher than is the case with caustic alkali. The tension will be 2.15 volts for an open circuit and sinks to 2.10 to 1.9 volts when discharging. In this form the combination of zinc and nickel oxid will not work as a pure oxidation battery, but as an accumulator, in that the bicarbonate takes the place of the free carbonic acid.

I claim as my invention—

1. A storage battery having a negative electrode of nickel oxid, a sponge-zinc plate as positive electrode and as electrolyte a solution of potassium or sodium aluminates, which are able to conduct the current, but not to dissolve the sponge-zinc electrodes after discharging.

2. In a storage battery having a negative electrode of nickel oxid and a sponge-zinc plate as positive electrode an electrolyte consisting of a solution of aluminates.

In witness whereof I have hereunto set my hand in presence of two witnesses.

STANISLAW LASZCZYNSKI.

Witnesses:
HENRY HASPER,
WOLDEMAR HAUPT.